United States Patent [19]
Traversat et al.

[11] Patent Number: 6,119,157
[45] Date of Patent: Sep. 12, 2000

[54] PROTOCOL FOR EXCHANGING CONFIGURATION DATA IN A COMPUTER NETWORK

[75] Inventors: Bernard A. Traversat, San Francisco; Tom Saulpaugh, San Jose; Jeffrey A. Schmidt, Boulder Creek; Gregory L. Slaughter, Palo Alto, all of Calif.

[73] Assignee: Sun Microsystems, Inc., Palo Alto, Calif.

[21] Appl. No.: 09/079,499

[22] Filed: May 14, 1998

[51] Int. Cl.[7] .................................................. G06F 13/00
[52] U.S. Cl. ............................. 709/220; 709/230; 717/11
[58] Field of Search .................................... 709/236, 230, 709/227, 228, 220; 717/11

[56] References Cited

U.S. PATENT DOCUMENTS

| 5,475,819 | 12/1995 | Miller et al. | 709/203 |
| 5,835,911 | 11/1998 | Nakagawa et al. | 707/203 |
| 6,029,196 | 11/1998 | Lenz | 709/221 |

FOREIGN PATENT DOCUMENTS

| WO 97/49023 | 12/1997 | WIPO. |
| WO 98/31124 | 7/1998 | WIPO. |

*Primary Examiner*—Kenneth R. Coulter
*Attorney, Agent, or Firm*—Beyer Weaver & Thomas LLP

[57] ABSTRACT

Methods and apparatus are disclosed for providing a data framework and associated client/server protocol for storing and exchanging data among computers in a network. A data schema having an n-way tree-type structure with a root node layer, intermediate node layers, and a data layer for storing configuration data is described. The intermediate node layers contain a multitude of nodes containing categorical information relating to components and various aspects of the computer network. Following a tree structure, each intermediate node and root node has branches emanating to nodes below it. These subordinate nodes are referred to as children nodes. The data node layer is at the bottom of the tree and contains actual specific configuration data relating to components and other aspects of the computer network, such as information regarding users registered to use the network. Certain portions of the intermediate nodes and data nodes make up persistent dataspaces in which the actual specific configuration data in the data nodes is modified on either a client or a server computer, and is stored on the server computer. This allows the associated specific information to be nonvolatile and accessible by a multiplicity of client computers. The client/server protocol allows configuration data to be transferred between a client and server and for the maintenance of the connection between the client and the server. Configuration data and user profiles are stored on a server computer thereby minimizing the amount of memory needed by the client computer, which can be a device with low memory capabilities such as network computers, PDAs, or smart cards. The protocol also includes a method of coalescing configuration data before sending it to a client computer thereby reducing the memory requirements of the client computer.

6 Claims, 15 Drawing Sheets

PROTOCOL FOR EXCHANGING CONFIGURATION DATA IN A COMPUTER NETWORK

CROSS-REFERENCES TO RELATED APPLICATIONS

This application is related to U.S. patent application Ser. Nos. 09/079,042, filed on May 14, 1998, entitled "PERSISTENT STORAGE MANAGERS FOR CLIENT/SERVER ENVIRONMENTS," 09/079,501, filed on May 14, 1998, entitled "A GENERIC SCHEMA FOR STORING CONFIGURATION INFORMATION ON A CLIENT COMPUTER", 09/079,102, filed on May 14, 1998, entitled "METHOD AND APPARATUS FOR A CORE APPLICATION PROGRAMMING INTERFACE," 09/079,103, filed on May 14, 1998, entitled "PERSISTENT STORAGE INTERFACE FOR A CONFIGURATION OBJECT-BASED SYSTEM," 09/079,500, filed on May 14, 1998, entitled "A GENERIC SCHEMA FOR STORING CONFIGURATION INFORMATION ON A SERVER COMPUTER," and U.S. Provisional Application No. 60/085,425, filed on May 14, 1998, entitled "JAVA SYSTEM DATABASE," which are incorporated herein by reference.

BACKGROUND OF THE INVENTION

1. Field of the Invention

The present invention relates generally to computer software and computer network applications. More specifically, it relates to client server applications and the exchange of configuration data among components in a computer network.

2. Discussion of Related Art

One type of conventional computer network involves connecting a series of personal computers referred to as clients (e.g., Sun SPARC workstations or IBM PCs), to one or more server computers. The client computers are generally self-sufficient and contain within their own memory much of the information needed to run user applications and perform network operations. That is, they contain information regarding their own configuration with regard to both software and hardware capabilities and requirements. The client computers typically access the network servers for a variety of reasons such as, for example, accessing network software applications, sending and receiving email, retrieving and storing information on a network database. However, information specific to a particular client computer generally resides on the client computer. This information can include, for example, the amount of memory or databus types, hardware specifications, such as what type of databus or additional processors. Since the client computers are relatively self-sufficient and store their own configuration information (and, thus is not available on the server computer), the task of data and application management on a client computer has become increasingly burdensome.

Although it is possible to propagate minor changes or fixes to applications that reside on a server on the network to the client computers, any significant upgrade or fix, or installation of a new application that effects every client requires that each client computer be accessed and updated individually by a network administrator. With the increasing number of computers being connected to networks ranging in the tens of thousands in some enterprises, the burden of installing major revisions or upgrades to application software or to general configuration software has become expensive, inefficient, and timeconsuming. In addition, because most client computers are self-sufficient, it is difficult for users who must use different client computers at different locations to maintain personal preferences with regard to the applications and configuration data. That is, even though a user can install personal preferences as defaults on their normally-used client computer, it is possible to replicate these defaults on other client computers without changing defaults on those computers.

Another type of computer network configuration involves the use of dumb terminals or "thin" clients connected typically to a mainframe computer. In this type of network, nearly all processing and data resides on the mainframe computer. The "thin" client performs none of these activities. In this type of configuration all the information regarding the client is under control of the mainframe computer. If the connection between the client and the mainframe is terminated, all processing stops, and the client cannot conduct any activity.

As described above, in the conventional network configuration, the process of installing new software or new applications is a static process. In such a configuration, the configuration information for each PC is defined on each client machine. Thus, the network administrator must staticly define each configuration on each PC. In a conventional computer network configuration, configuration information for each particular sub-system or client is hardcoded in the particular client. Furthermore, with conventional network configurations using self-sufficient clients connected to network servers, application maintenance such as installing new versions or major upgrades to software, where the upgrade requires knowledge or access to a subsystem's configuration, normally requires that the application or the network be "brought down" to do the maintenance.

With conventional computer networks that have multiple clients and a server in which the server contains information that is needed by a client for various reasons, in many cases all the data on the server needed by or relevant to the client is moved from the server to the client. This can typically involve moving large amounts of data, much of which may not be used or is not necessary for the client to operate. Transferring all the data to the client is inefficient and increases network traffic. In addition, the client must have sufficient memory and storage to store all information relating to that particular client from the server. For example, devices such as PDAs and smart cards which do not have large amounts of storage cannot contain in its own memory all information including configuration information that might be relevant to that particular device.

Therefore, it would be desirable to have a system which supports distributed management of client configurations by storing such configuration information at a central repository. This would allow a network administrator to manage subsystem configurations from the server, and to propagate all types of changes to applications from a server. It would also be desirable to allow a network user to log onto different clients and still be able to access that user's personal preferences and profiles on any client on the network. Furthermore, it would be desirable to have a method that allows the transfer of data from a server to a client in a efficient and fully operational manner. It would also be desirable to send data to the client that is in a condensed and compact form in the sense that the client does not receive repetitive data.

SUMMARY OF THE INVENTION

To achieve the foregoing, and in accordance with the purpose of the present invention, a method, apparatus, and computer readable medium for creating a data framework and associated protocol for storing and exchanging data among computers in a network are provided. In accordance with one aspect of the present invention, a data schema having an n-way tree-type structure with a root node layer, intermediate node layers, and a data layer for storing configuration data, is described. The intermediate node layers contain a multitude of nodes containing categorical information relating to components and various aspects of the computer network. Following a tree structure, each intermediate node and root node has branches emanating to nodes below it. These subordinate nodes are referred to as children nodes. The data node layer is at the bottom of the tree and contains actual specific configuration data relating to components and other aspects of the computer network. Certain portions of the intermediate nodes and data nodes make up persistent memory areas in which the actual specific configuration data in the data nodes is modified on either a client or a server computer, and is stored on the server computer thereby making the associated specific information nonvolatile and accessible by a multitude of client computers.

In one embodiment of the present invention, the data schema or framework has a client schema sub-component that resides on a client computer and a server schema sub-component that resides on one or more server computers. In yet another embodiment, user preferences and profiles are stored in the server schema thereby allowing a user on the network to use any of the client computers on the network and access the user's preferences. Also stored on the server schema are client computer platform and profile information. In yet another embodiment, the persistent memory areas contain a multitude of data entries, each data entries having a name, a list of related nodes, property names and associated property values.

In another aspect of the present invention, a data schema for arranging and storing information relating to a client computer in a computer network having a server computer, is described. The data schema includes a root node and a multitude of intermediate node levels containing intermediate nodes. Each intermediate node represents or stores categorical information relating to the computer network and the client computer. The schema also contains actual configuration information corresponding to the categorical information in the intermediate nodes. The categorical and configuration information resides on the client computer thereby allowing the client computer to adapt to various profiles and preferences determined when the client computer is powered and connected to the network.

In one embodiment, the multitude of intermediate node levels includes a top intermediate node level having top intermediate nodes. Each top intermediate node defines a dataspace having a multitude of data entries. In another embodiment, one of the dataspaces referred to as the software dataspace is a persistent dataspace which allows data entries in the dataspace to be saved when the client computer is turned off or disabled.

In another aspect of the present invention, a data schema for arranging and storing configuration information relating to a multitude of client computers in a computer network having a server computer that stores the data schema, is described. The data schema includes a root node and a multitude of intermediate node levels containing intermediate nodes. Each intermediate node represents or stores categorical information relating to the computer network and client computers on the network. The schema also contains actual configuration information corresponding to the categorical information in the intermediate nodes that is arranged in a data level of the schema. The categorical and configuration information resides on the server computer thereby enabling the server computer to propagate client computer profiles and preferences when requested by a client computer.

In one embodiment, the multitude of intermediate node levels includes a top intermediate node level having top intermediate nodes. Each top intermediate node defines a dataspace having a multitude of data entries. In another embodiment there are two dataspaces, a machine dataspace and a users dataspace, which are both persistent dataspaces, which allows data entries in the dataspace to be saved when the client computer is turned off or disabled. In yet another embodiment, the machine dataspace stores computer configuration data relating to the multitude of computer types on the network and the users dataspace stores user configuration data relating to the multitude of users that are registered to access the computer network.

In another aspect of the present invention, methods, apparatus, and computer readable medium for preparing data for transmission over a computer network are provided. A data set containing values relating to the profile and platform of a client computer is retrieved on a server computer. Another data set containing values relating to a user preference and user group associated with a user using the client computer is also retrieved on the server computer. The two data sets are related in that they correspond to a user logging onto a particular client computer. A data item correspondence is created by associating data items in the two data sets on a property-by-property basis. A set of rules containing a list of priorities among data categories is applied to the data item correspondence. A final data set is derived from applying the rule set to the data item correspondence and is sent over the network to a destination computer. By sending the final data set over the network, the amount of data that would be sent if the first two data sets had been sent in their entirety is reduced.

In one embodiment a connection is established between the client computer and the server computer. A client profile is sent from the client computer to the server computer. In another embodiment, the set of rules includes an order of preferences for determining which data items from the first two data sets will be included in the final data set. In yet another embodiment, the client computer is a network computer.

In yet another aspect of the present invention, methods, apparatus, and computer readable medium for configuring a computer in a network having a server computer are provided. A connection between the computer having a profile and a server computer is established. The profile of the computer is sent to the server. The server then retrieves configuration information stored under control of the server according to the profile. The computer is configured according to the configuration information retrieved on the server and sent to the computer, thereby facilitating centralized management of configuration information by the server computer.

In one embodiment, the profile includes hardware information relating to the client computer and information relating to a user of the client computer. In another embodiment, the client computer and server computer exchange version information associated with software to be used to exchange data between the two computers. The exact version of the software to be used is determined by the server computer. In yet another embodiment, the client computer is a network computer. In yet another embodiment, the server computer stores configuration information relating to a multitude of client computers on the network and to users registered to use the computer.

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A data framework or schema and associated protocol for exchanging data residing in the schema among computers in a computer network is described in the various drawings. The present invention discloses a hierarchy or data schema for representing and storing configuration information and related information in a system database. For the purposes of illustrating one embodiment of the present invention, a Java system database (JSD) is examined. In other preferred embodiments, the system database can operate on other types of platforms. The JSD of the described embodiment is a single subsystem that includes at least two major sub-components, or sub-schema's, the client schema and the server schema. In the described embodiment, data relating to a client is stored in a client schema that resides in the client memory. Configuration data for each of the clients is stored in a server schema which resides on a network server. Configuration data is exchanged between the two schema's or hierarchies through a client/server protocol which insures that the correct information is derived from the server schema and is transported or entered into the client schema on the client machine and vice versa. The configuration information for each client, also referred to as subsystem, is stored in the server schema. This is in contrast to conventional networks where configuration information regarding a client is hardcoded or stored on the client machine. The data schema of the present invention allows a network administrator to manage configuration information for each of the computers in the network from a central repository such as a single server. Thus, any software updates, version upgrades, or installation of new applications that require knowledge of and access to a subsystem configuration can be implemented from the central repository and propagated to the individual clients. Users on the client machines will not have to exit applications and, moreover, the network does not have to be brought down for maintenance in order to install or propagate the new upgrade or version of the application.

Figure 1:
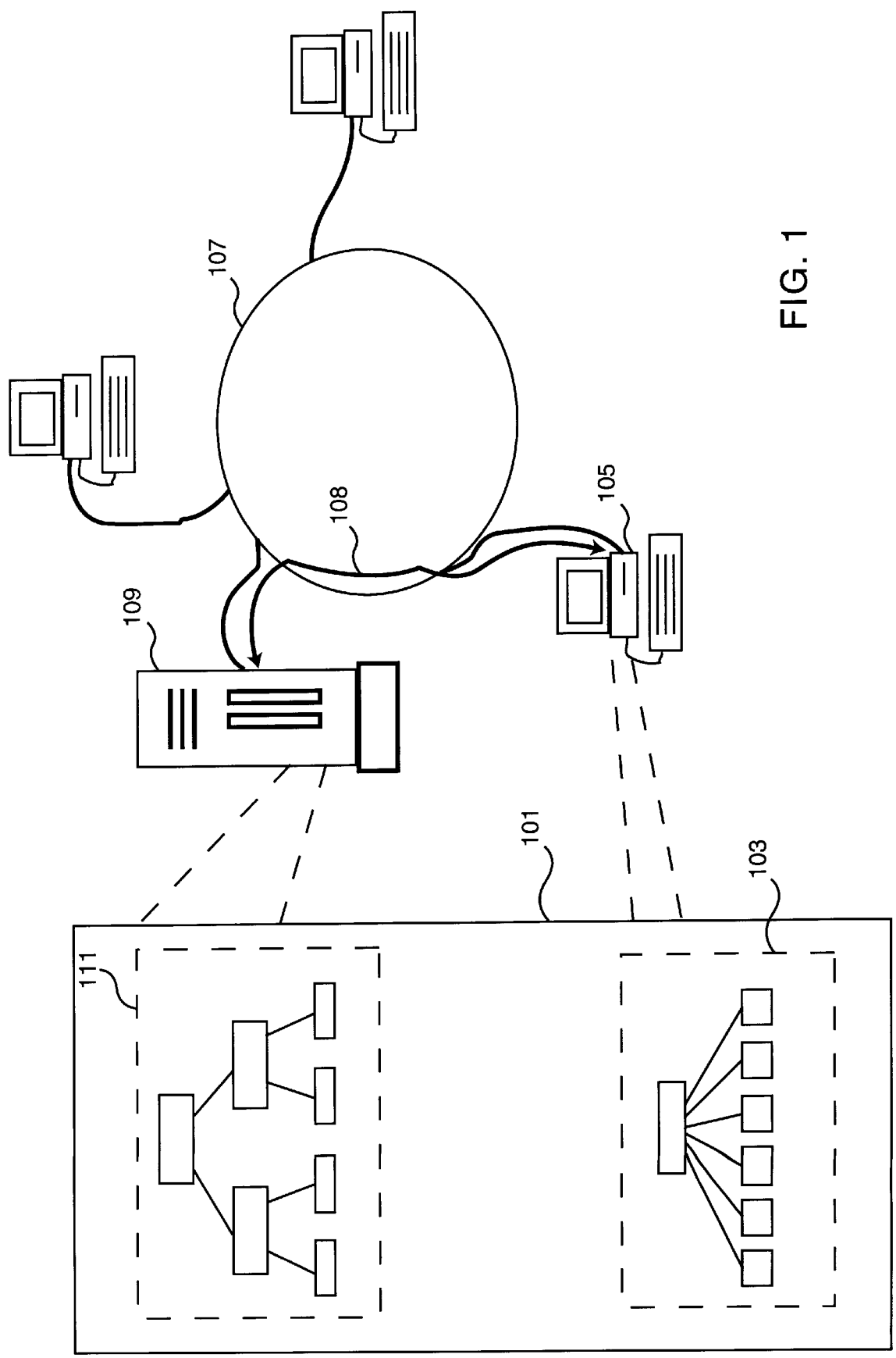
FIG. 1 is a block diagram showing components of a computer network configuration showing a system-wide data schema in accordance with one embodiment of the present invention.

FIG. 1 is a block diagram showing components of a computer network configuration showing a system-wide data schema in accordance with one embodiment of the present invention. In the described embodiment, the system-wide data schema is illustrated as a Java system database JSD (101) that consists of a client schema 103 which resides on a client machine 105 as part of network 107. A server schema 111 resides on a server computer 109 which is part of network 107.

Figure 2:
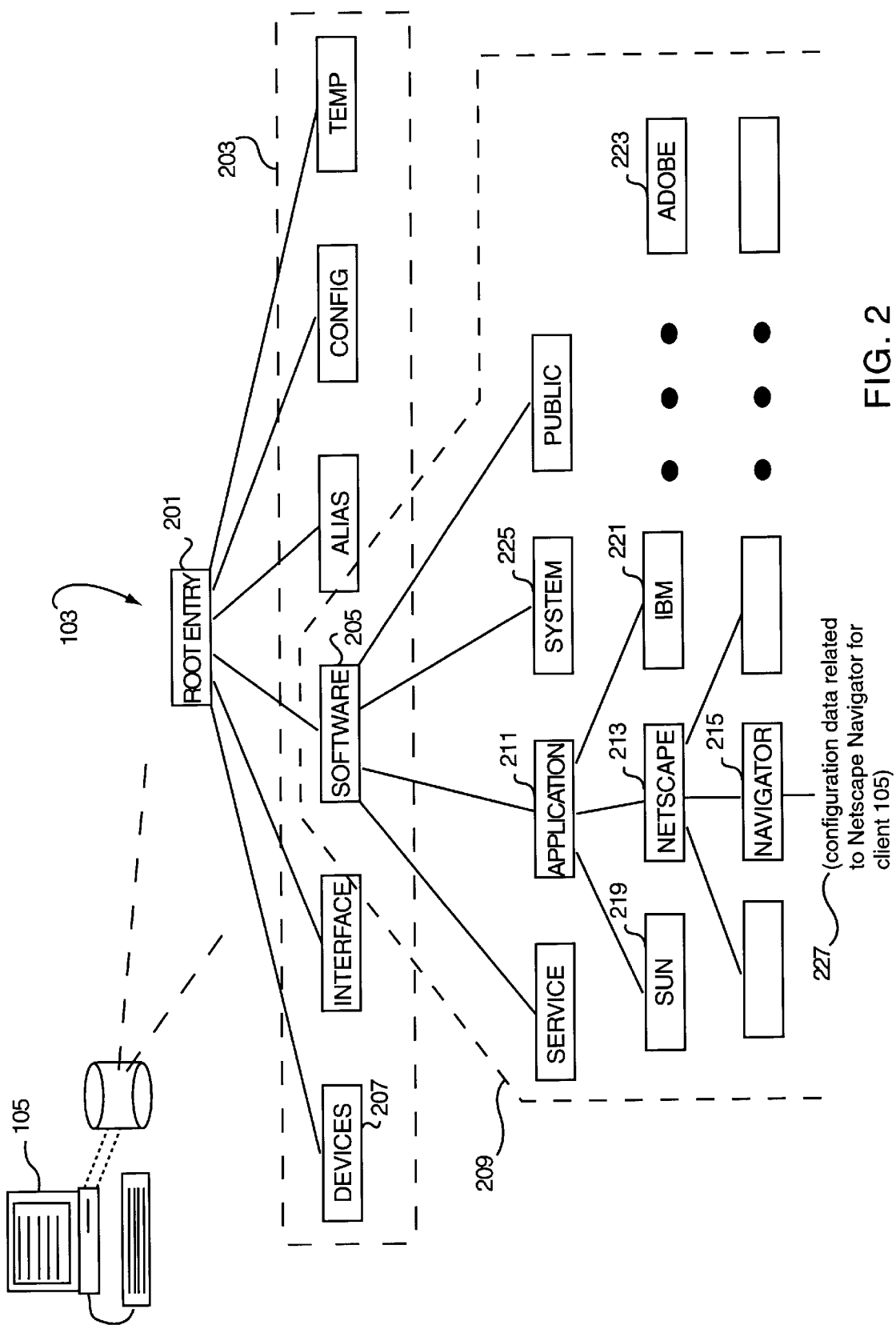
FIG. 2 is an illustration of an n-way tree structure representing a client schema hierarchy in accordance with one embodiment of the present invention.

FIG. 2 is an illustration of an n-way tree structure representing client schema hierarchy 103 in accordance with one embodiment of the present invention. The hierarchy of client schema 103 as well as the hierarchy of server schema 111, is manifested using an n-way tree. At the root of the tree is a root entry 201 which does not contain any data and is the only node framework in the hierarchy that references itself. A first level of nodes 203 in client schema 103 collectively define individual namespaces in the generic client schema. The first level 203 in the hierarchy below root entry 201 and contains the namespace entries.

In the described embodiment, there are six namespaces in generic client schema 103. In other preferred embodiments, there may be more or fewer namespaces depending on the needs of a particular network configuration. In the described embodiment, the standard top level namespaces for the JSD client are SOFTWARE, DEVICE, INTERFACE, SOFTWARE CONFIGURATION, ALIAS, and TEMP. For example, the SOFTWARE namespace begins at node 205 and includes all nodes and data branching from node 205. The specific entries in layer 203 of the hierarchy are roots of sub-trees that define the unique namespaces. All entries in a particular namespace, such as SOFTWARE, are entries that relate to configuration data regarding software applications for client 105. Entries in the data schema of the present invention are made up of a unique name, a list of children (entries below the given entry) and a set of tuples. Each tuple contains a property name and associated property value. For example, in a wordprocessing program a property name can be "font" and the property value can be Palentino. Similarly, all entries under the DEVICE namespace 207 are entries that are related to configuration information of client machine 105 on which client schema 103 resides. Every entry in the hierarchy may act as both an entry in a sub-tree and the root of a sub-tree having descendent entries or children nodes. Each namespace in layer 203 is described in U.S. Provisional Application filed on the same date herewith and commonly assigned, entitled "JAVA SYSTEM DATABASE," which is incorporated herein by reference.

As shown in FIG. 2, each entry in the tree has a single parent and can have several children nodes. A namespace such as SOFTWARE namespace 209 is a specially designated sub-tree that includes entries that relate to configuration data on software for a particular client such as client 105. As shown in FIG. 2 in the described embodiment, namespaces are always direct descendants of a root entry 201, also referred to as a super root. In other preferred embodiments, namespaces can be defined at other levels in the hierarchy and need not descend directly from root 201. The standard namespaces of the JSD schema client are created during the startup or booting procedure of the client compute. Each of the namespaces in the described embodiment are available in all implementations of the Java platform. The six namespaces are well known namespaces that are initialized by the Java platform. Other dynamically constructed namespaces can be added to the standard database namespaces after initialization.

Each namespace is managed by a default namespace manager. The namespace manager controls how the entries are stored and accessed within the namespace. The manager implements a standard interface that exports the security, storage, and ownership attributes of any entry in the namespace SOFTWARE namespace 209, for example, contains a list of installed and/or available systems services such as device drivers, user applications, and user configuration information. The software namespace is the only namespace in the client schema persistent in that a server provides a backup store for all entries in this namespace. A persistent name space or entry as opposed to transient name space are entries that must be saved on a persistent storage location. An example of persistent entries are configuration information related to user environments that needs to be stored on persistent storage. When a user logs on, his or her last saved environment needs to be retrieved so he or she does not have to reset the environment. Persistent entries are entries that can be saved and retrieved from a permanent storage location. Persistent and transient namespaces are staticly separated when namespaces are created. A persistent entry is not allowed to reside in a transient name space and/or a transient entry is not allowed to reside in a persistent name space. In the described embodiment, persistent entries are stored on a remote JSD server. In the described embodiment, under the SOFTWARE namespace there are four categories: application, system, service, and public. In the described embodiment, using the Java platform, some of the entries in the SOFTWARE namespace are arranged using Java-unique naming conventions and other non-Java related entries having naming conventions based on specific applications. In the described embodiment, company names such as IBM, Sun, or Lotus are given names such as com.IBM, com.Sun, and com.Lotus. These company names distinguish company-specific information. Entry names below the company entry are company-specific.

As described, the SOFTWARE namespace 209 is the only namespace of the six that has persistent storage in the described embodiment. The other namespaces such as DEVICE namespace 207 have transient storage. Entries in these namespaces are lost when the client computer is turned off. This is true in the described embodiment because the five transient namespaces store data that relates specifically to a client computer. In the described embodiment, the SOFTWARE namespace contains application configuration information which needs to be saved after the computer is turned off.

Under the software namespace are four categories: application, system, service and public. Using the application category as an example, an entry com.Netscape 213 contains the company-unique name (e.g., Netscape) and below com.Netscape entry 313 is an entry for one of Netscape's products Netscape Navigator. Under entry 215 is company-specific information 217 relating to Netscape Navigator.

Entries 219, 221 and 223 are entries for other vendors which will also have entries similar to entry 215. In the described embodiment, the structure of the device namespace 225 reflects some or all of the inputloutput bus and the devices present on the client. In other words, the physical connectivity of buses and devices are represented as a tree of entries where a particular bus is the parent and leaf entries contain configuration data on the devices.

In the software namespace, the leaf node level of the hierarchy contains data 227 that is configuration specific and is arranged according to how the application, for example Netscape Navigator, wants to order the specific data in the leaf node level. For a wordprocessing application, the leaf node entries would contain specific information such as font, dictionary definitions, and other wordprocessing type configuration data.

Figure 3:
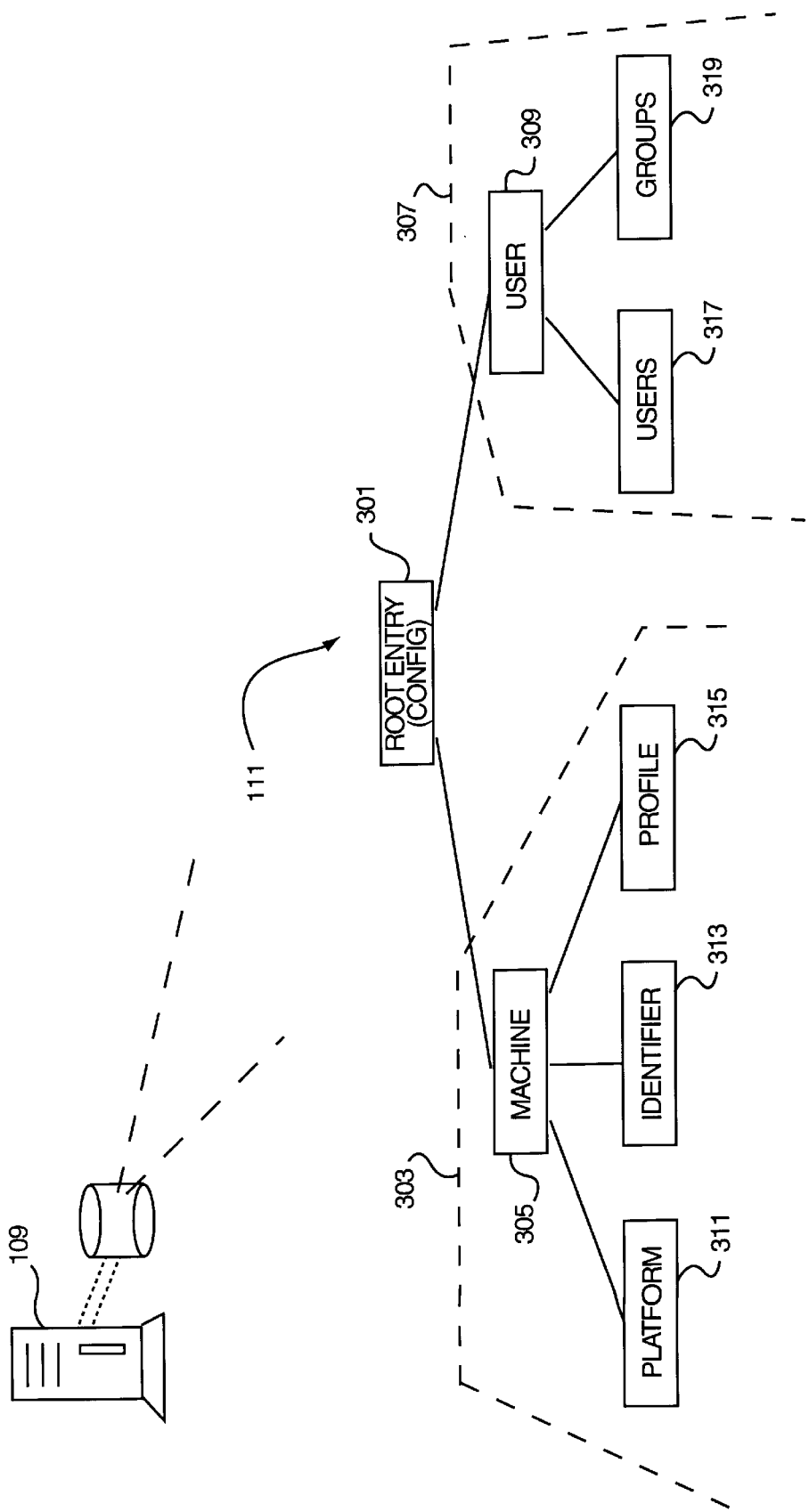
FIG. 3 is a block diagram showing a structure of a JSD server schema in accordance with one embodiment of the present invention.

The namespaces in the server schema component of the JSD are persistent storage spaces; that is, they remain after the client computer is turned off. In the described embodiment, there are two namespaces in the server schema: machine and user. FIG. 3 is a block diagram showing a structure of a JSD server schema in accordance with one embodiment of the present invention. It shows a server computer 109 and server schema 111 of FIG. 1 in greater detail. At the top of the n-way tree is a root entry 301, also representing a CONFIG namespace in the described embodiment. As mentioned, there are two namespaces in the server schema. Area 303 represents the machine namespace having a machine node 305. Area 307 represents the user namespace having a user node 309.

Machine namespace 303 is made up of three categories in the described embodiment. In other preferred embodiments, the machine namespace 303 may have more or fewer sub-categories depending on the platform and requirements of the network. The three categories or sub-ranges are platform 311 identifier 313, and profile 315. Under platform 311 are a number of entries that refer to specific computer manufacturers such Sun Microsystems and IBM Corporation. This is shown in greater detail in FIG. 4.

Figure 4:
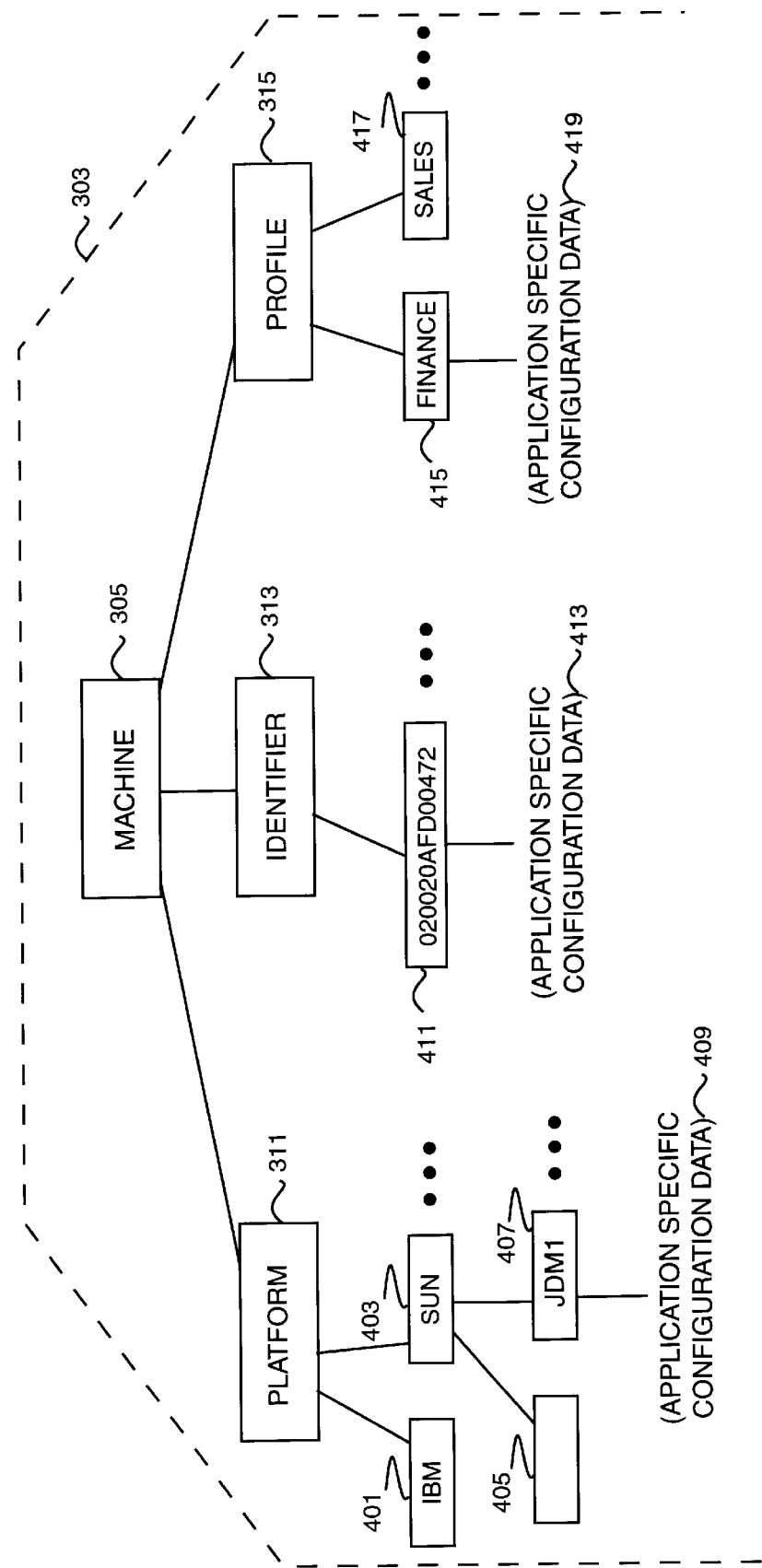
FIG. 4 is a block diagram showing a tree structure of machine namespace in a server schema.

FIG. 4 is a block diagram showing a tree structure of machine namespace 303 in server schema 111. As mentioned, under the platform 311 category are vendor-specific sub-ranges 401 and 403. The number of entries at this level depends on the number of different computer manufacturers used in the network. Under a particular manufacturer such as com.Sun are a number of entries shown as entries 405 and 407, where each entry refers to a particular model or type of computer made by that manufacturer. For example, under com.Sun there is the computer type JDM1 and under com.IBM there are computer types NS1000 and NS2000. Under each computer type or model are leaf nodes 409 that specify application configurations for that particular type of computer. With regard to the type sub-category, the application configuration information in the leaf entries or leaf nodes contain all possible configurations applicable to a particular computer, i.e., the computer indicated in the parent entry.

Under the identifier sub-category having identifier root entry 313, are entries that contain a unique identifier 411 for each computer in the network 107. In the described embodiment, a MAC address for each computer is used as the unique identifier. The data 413 under a particular client identifier 411 is application configuration information that is specific to that particular computer. Configuration data 413 is distinguishable from configuration data 409 under the platform category in that the data 413 under identifier applies to a specific computer as configured by a particular user. In the described embodiment, there are cross-references (not shown) among unique identifiers 411 under the identifier category and the entries under the platform category. That is, there is a reference to a particular type of computer from a specific identifier. This allows the server to determine what platform or type of computer a particular unique identifier refers to.

Under the profile category having a profile root entry 315 are entries that describe particular categories or uses of computers in the network. The configuration information for the particular profiles which can also describe, for example, departments within a company, is contained under the profile's sub-category. Examples are shown at nodes 415 and 417 indicating Finance and Sales profiles. Under Finance node 415 is application specific data 419 containing data related to the Finance profile. Similar to references from the unique identifiers to the platform entries there is also a reference from specific identifiers to a profile entry if applicable. That is, if a particular computer has a certain profile, such as a computer that is used in the accounting department or a computer that is used strictly as a receptionist terminal there is a reference from that particular computer's identifier to the appropriate profile entry.

Figure 5:
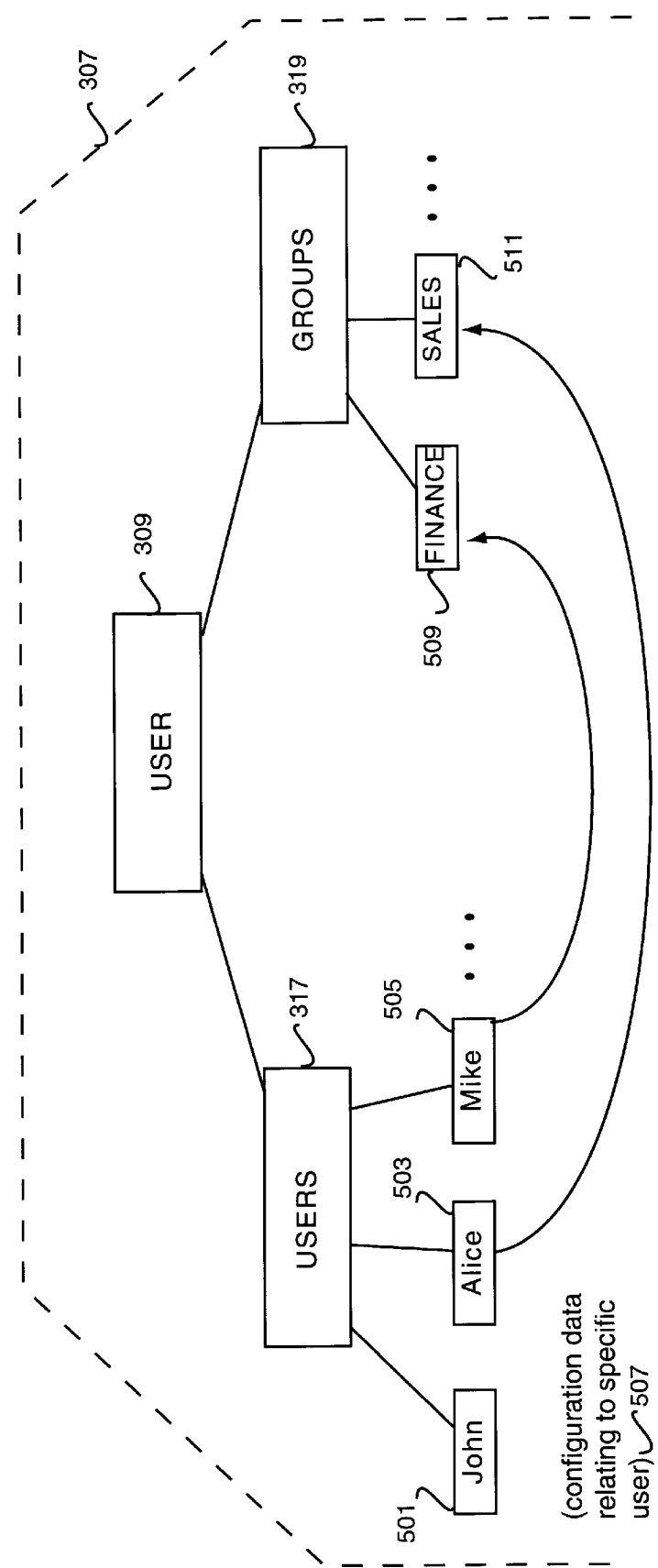

FIG. 5 is a block diagram illustrating a user namespace in accordance with one embodiment of the present invention. In the described embodiment, the user namespace 307 has two categories: users and groups. The users node 317 represents names of the individual users on the computer network such as shown in nodes 501, 503 and 505. Under each user's individual node is specific configuration data that contains the personal preferences of that individual user such as shown at 507. For example, in a wordprocessing application, a particular user preference could be a default font and size for documents. This category allows an individual user to use any computer on network 107 and have that user's personal configuration available on that computer. For example, if the user brings up a wordprocessing program, the user's preferences will be the default instead of the default of the normal user of that computer. The other category in the user namespace is the groups category having a groups node 319. This category contains entries relating to particular groups of users. Groups can include a variety of categories such as departments within a company or categories that distinguish employees in a company from other employees such as shown at nodes 509 and 511. In the described embodiment, there are reference pointers going from the individual users 503 and 505 under the users category 317 to one or more particular groups where appropriate.

Figure 6A:
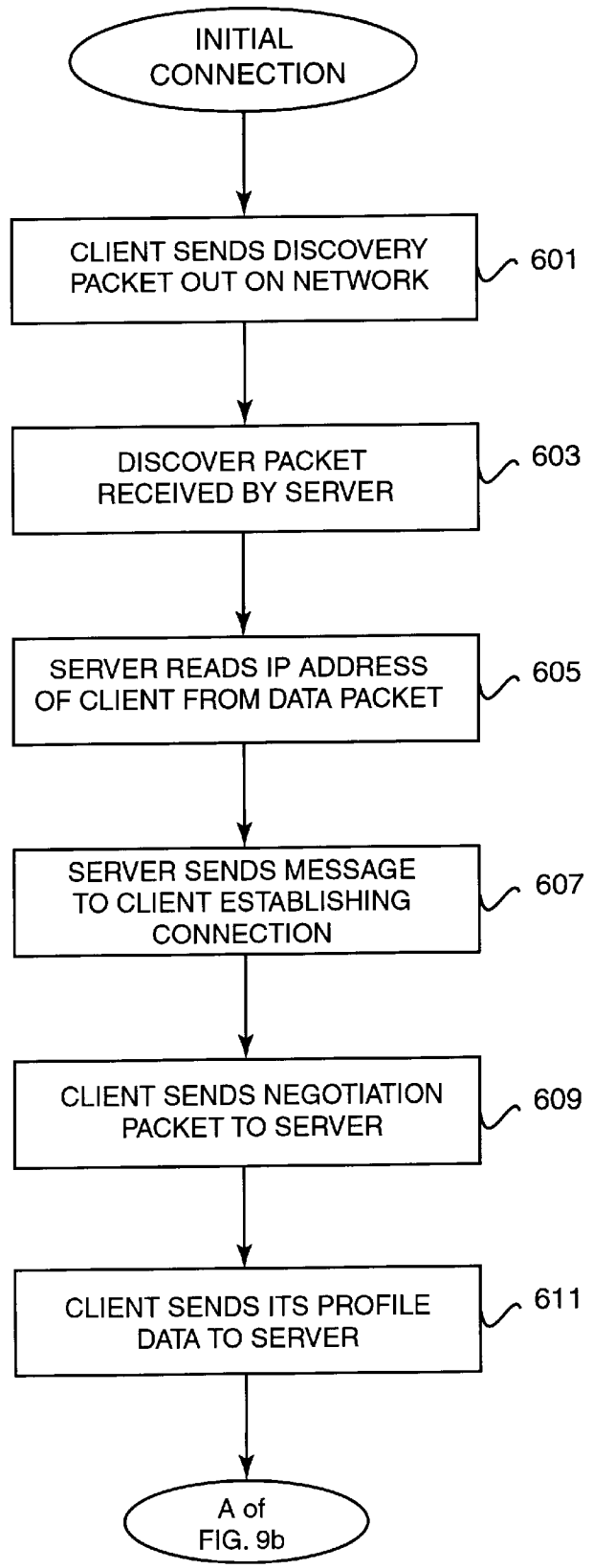
FIGS. 6a–6c are flowcharts showing a process of establishing a connection between a client and a server and exchanging configuration information in accordance with one embodiment of the present invention.
Figure 6B:
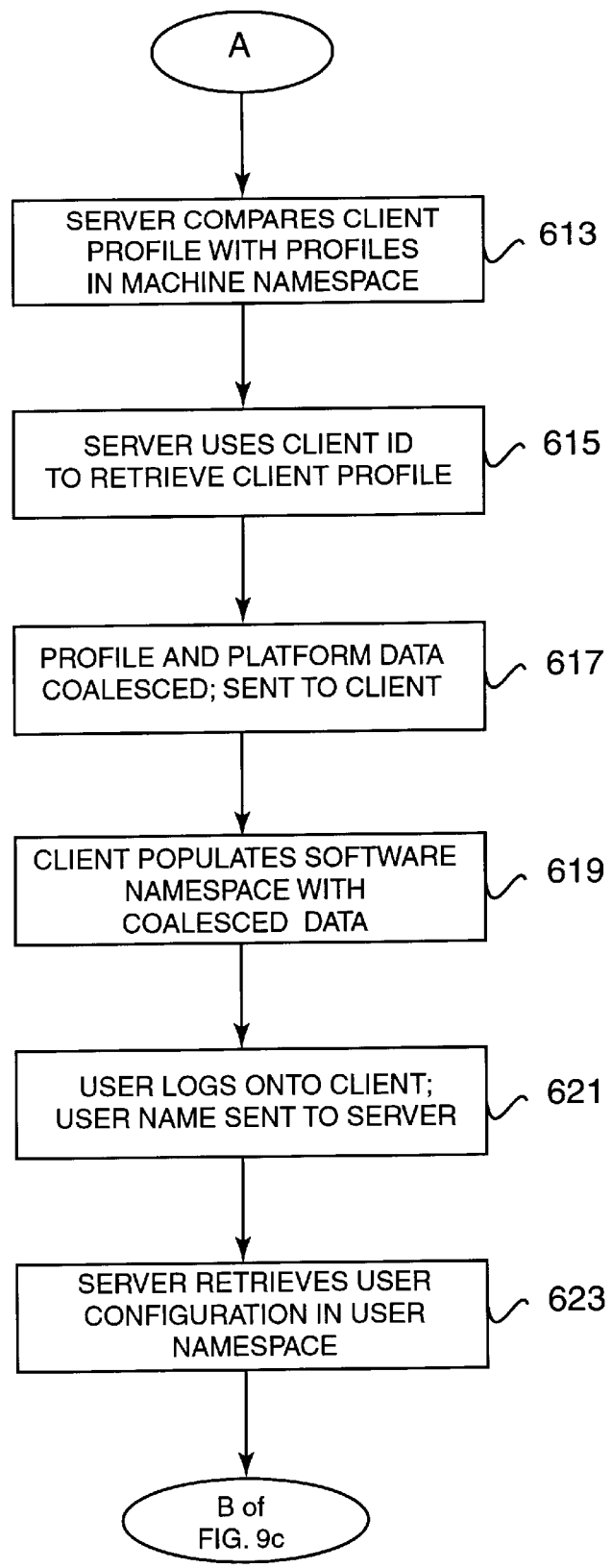
Figure 6C:
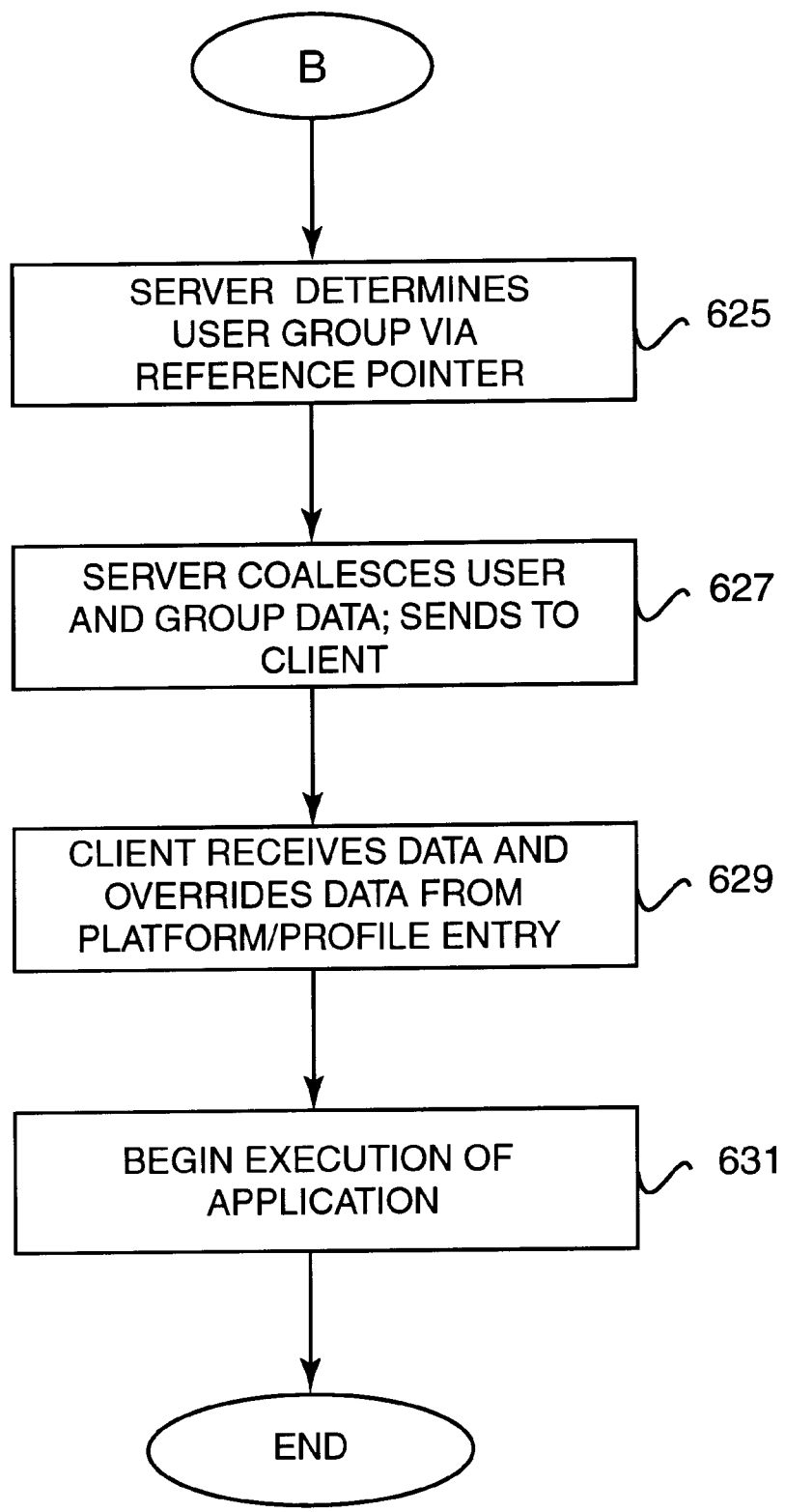

In the present invention data is exchanged between a client and a server in the computer network according to a client/server protocol described in the various figures. This single protocol, illustrated by arrow 108 in FIG. 1, between client 105 and server 109 as shown in FIG. 1, is a set of rules and procedures by which connections are established and data is exchanged between a client and server. The server in the described embodiment is able to exchange data and communicate with external services and storage media using many different protocols. The protocols supported by the JSD server are diverse, persistency-type protocols on the back end of the server. The client/server protocol between the JSD client and the JSD server, on the other hand, is sufficiently generic and broad to support the diverse array of protocols that typically can be supported by the JSD server to exchange data with external entities such as persistent storage, data registries, file servers and data directories. The client/server protocol in this context is designed to have a small "footprint." By placing the complexity of managing the multiple protocols that are necessary to communicate with external entities connected to the server, the burden of having to manage these protocols is not placed on the individual clients. Thus, what is described is a two-tier model in which the first tier is the client/server protocol of the present invention between the JSD client and server, and the second tier is the multiple protocols supported by the JSD server and the various external services and data storage entities. FIGS. 6a–6c are flowcharts showing a process of establishing a connection between a client and a server and exchanging configuration information in accordance with one embodiment of the present invention. At step 601 of FIG. 6a, a client computer in the computer network attempts to open a communication link with the network. At this step the client sends a discovery packet out to the network with the intention of connecting to a server. In the described embodiment, the data packet is a DHCP discovery packet which contains information about the client. At step 903 a network server receives the discovery packet. In the described embodiment, the client computer contains client schema 103 and the server computer contains server schema 111 which collectively define the JSD 101 as described in FIG. 1. At step 605 the server computer reads the IP address of the sender (an example of a unique identifier) of the discovery packet. In the described embodiment, the IP address is used as a unique ID for the client sending the data packet. In other preferred embodiments, other identifiers, such as a MAC ID, can be used as a unique identifier.

At step 607 the server sends to the client a packet stating that the client has now established a connection with that particular server. The server is essentially telling the client that the client will now be communicating with the server. At step 609 the client sends a negotiation data packet to the server. This step is described in greater detail in FIG. 7. The purpose of the negotiation packet is to establish the version of the software that will be used for communication between the client and the server. Once the version of the software has been established the client sends its specific profile information to the server at step 611. In many instances this specific profile information is typically hardcoded in the clients PROM. For example, the specific profile information for a client would include the type of computer such as a Sun JDM1 workstation or an IBM NS1000 computer. Once the server receives the profile information from the client, the server attempts to match the profile with a specific profile in its machine namespace 303 under the platform sub-category 311 at step 613 of FIG. 3. The server schema machine namespace 303 contains the category platforms 311 which stores specific profile information on particular types of computers made by computer manufacturers. At step 613 of FIG. 6b the server searches for the client's profile in the machine namespace. At step 615 the server uses the unique ID of the client to determine if the client has a specific profile. Recall that in the machine namespace the category identifiers contains unique IDs of all the clients in the network. If the client has a specific profile, such as receptionist or sales there is a reference pointer from the unique identifier to the corresponding profile.

At step 617 the server collapses or combines the profile data (if any), and the platform data and sends the collapsed or coalesced data entry to the client's software namespace. A process for coalescing the profile data and the platform data is described in greater detail in FIG. 8a and 8b. In the described embodiment, data regarding the platform of the computer is overridden by data in the computer-specific profile if there is one for that computer. At step 619 the client populates its software namespace 209 within its client schema 103 with the coalesced data entry from the server. At this point the boot-up stage for the client computer is complete.

At step 621 a user logs on to the client computer thereby starting the log on phase. At this point the user's name is sent to the server. At step 623 the server takes the user name to retrieve a configuration in the users namespace 307 in the server schema. Recall that the server schema 111 has two namespaces in the described embodiment: machine namespace 303 and user namespace 307. Under the user namespace there are two categories: users 317 and user groups 319. The server at step 623 searches for a user configuration using the user's name. At step 625 of FIG. 6c the server determines whether the user belongs to a group as represented by group node 319 by checking for reference pointers from the users entry to an entry in the group category. At step 627 the user configuration entry and the group configuration entry is coalesced into a single user entry and sent to the client. In the described embodiment, data in the user configuration entry overrides any corresponding date in the user group configuration entry. The process of coalescing the data from the user entry and the group entry is described in greater detail in FIGS. 8a and 8b. At step 629 the client receives the user entry and, if necessary, overrides the data previously populated in the software namespace in the client schema by the platform/profile entry. In the described embodiment, the user configuration entry sent to the client at step 627 overrides any corresponding data that was sent at step 619. It should be noted that in the described embodiment only the software namespace in the client schema is populated by data from the server because it is only the software namespace that contains persistent data. That is, data that resides in permanent storage or nonvolatile storage on the server computer. In other preferred embodiments, other namespaces may contain persistent data depending on the needs of the computer network. At step 631 the user of the client computer can start a particular application. At this stage the client computer can start a particular application by going into the software namespace of its client schema to get the appropriate configuration data for the application. At this stage all the configuration data necessary for applications to run on the client computer has been transferred from the server to the client. In addition, only configuration data that will be used by the client computer is transferred to the client from the server as a result of the coalescing performed on the server.

Figure 7:
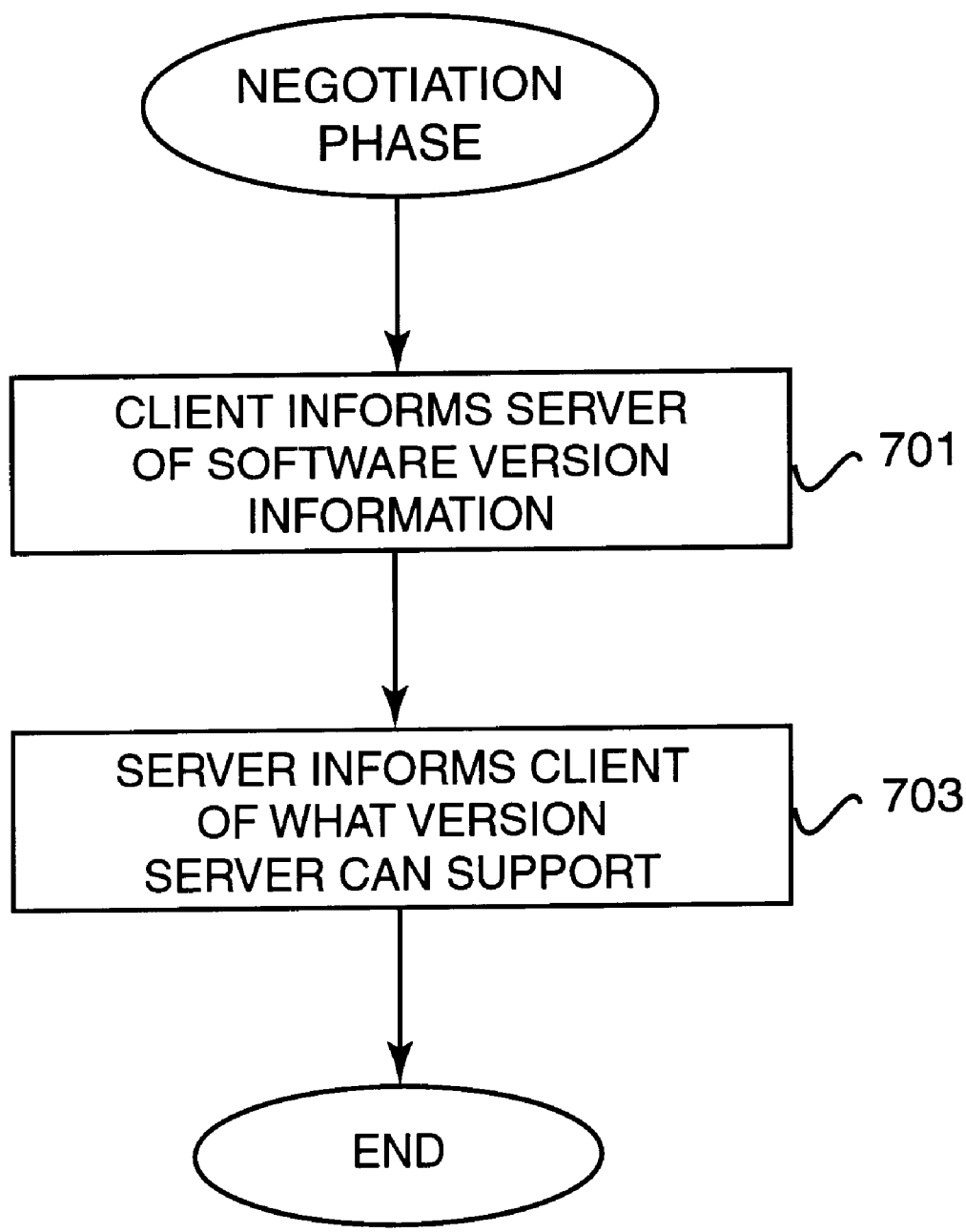
FIG. 7 is a flowchart showing a process for negotiating a communication link between a client and a server in accordance with one embodiment with the present invention.

FIG. 7 is a flowchart showing a process for negotiating a communication link between a client and a server in accordance with one embodiment with the present invention. It shows in greater detail step 609 of FIG. 6a. At step 701 a client informs a server of version information regarding the client's software. The version information may also describe hardware components of the client. This data is sent in data packets via TCP/IP. At this step the client is simply informing the server of what version of operating software the client is using. At step 703 the server examines this version information and informs the client of what version of the operating software the server can support. By doing this, the server dictates which version of the operating software will be used to exchange configuration data between the client and the server.

Figure 8A:
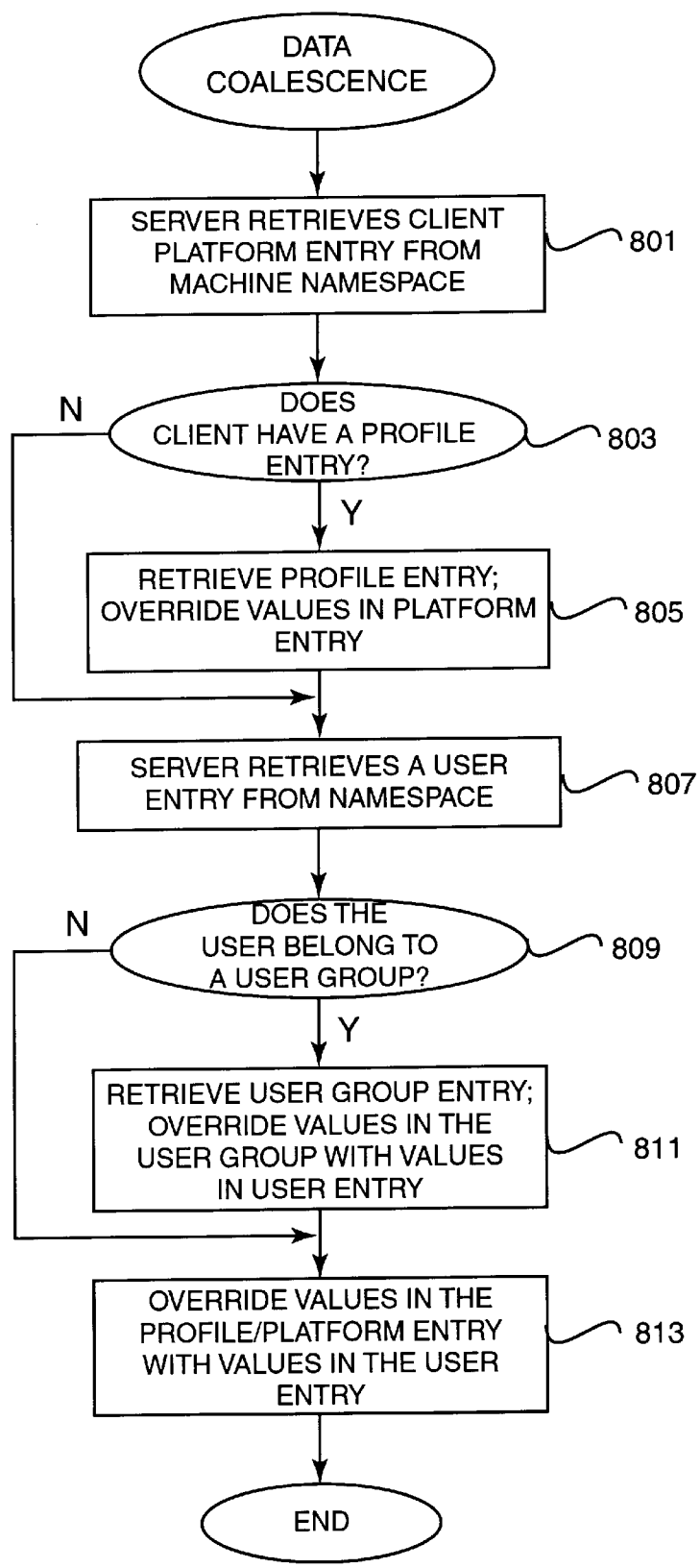
FIG. 8a is a flowchart showing in greater detail steps 617 and 627 of FIG. 6.

FIG. 8a is a flowchart showing in greater detail steps 617 and 627 of FIG. 6. It shows a process of coalescing configuration data related to a particular client on the server in the described embodiment. The data is coalesced according to a hierarchy shown in FIG. 8b in that certain data items in a data entry may be overridden by corresponding data items from other namespaces or categories. At step 801 the server retrieves a platform entry from the platform sub-tree in the machine namespace on the server. The platform entry contains specific information on the client computer type. At step 803 the server determines whether the client has a corresponding profile entry by checking whether there is a reference pointer from the client machine-eunique ID to a particular profile in the profile category. If the client has a profile entry, the server retrieves the profile entry at step 805. At step 805 the values in the profile entry and the platform entry are coalesced. Values for properties that are contained in both entries are coalesced on a property-by-property basis according to a hierarchy shown in FIG. 8b. In the described embodiment, values in the profile entry that have a matching property value in the platform entry are overridden by the profile entry values. The coalescing of entries is done on a property-by-property basis. If the client does not have a profile entry as determined at step 803, control goes to step 807.

At step 807 the server retrieves a user entry from the users namespace in the server schema. At step 809 the server determines whether the user who logged on belongs to any of the groups 319. At step 811 the server retrieves a group entry but overrides, again on a property-by-property basis, values in the group entry with values in the users entry. At step 813 the server overrides values in the profile/platform entry from step 805 with values in the coalesced user entry. If the server determines that the user does not belong to a group in 809, it proceeds with step 813. At step 815 the coalesced data entry relating to the user logging onto the client is sent to the client computer and the process is complete.

Figure 8B:
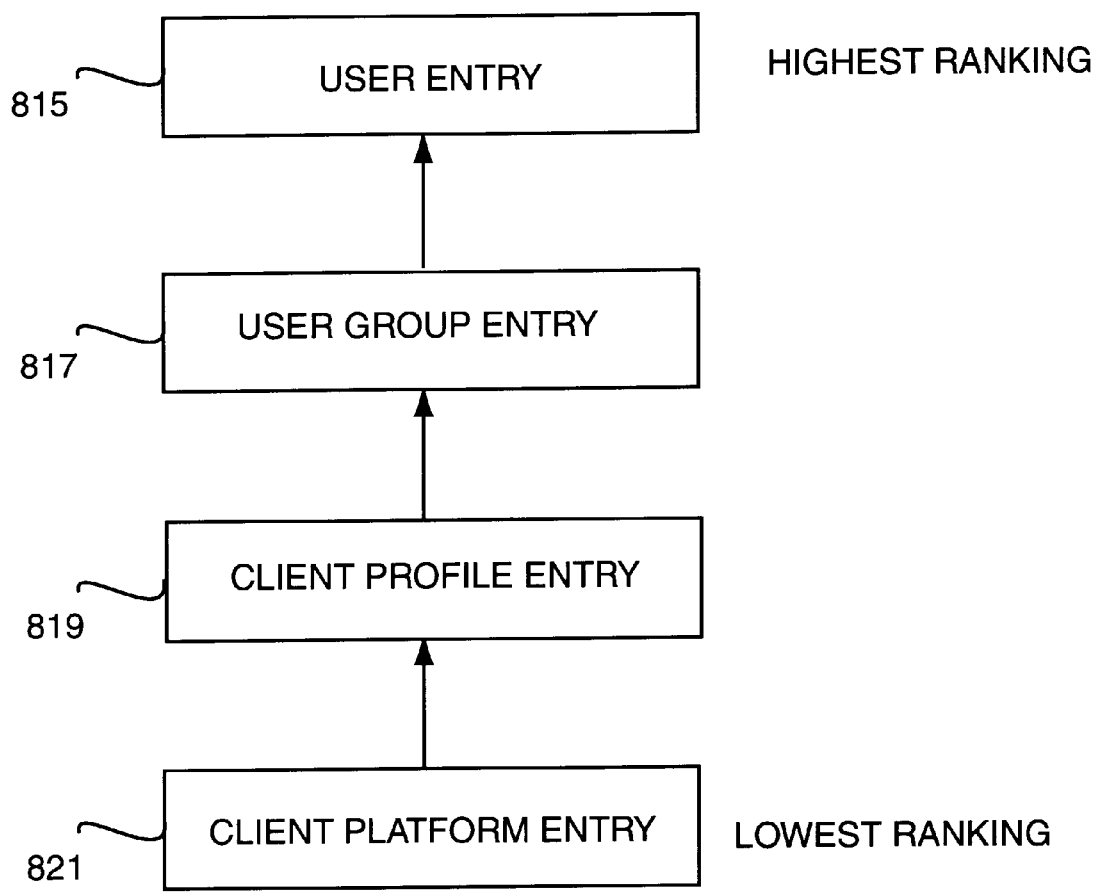
FIG. 8b is a block diagram showing the hierarchy used to coalesce data in accordance with one embodiment of the present invention.

FIG. 8b is a block diagram showing the hierarchy used to coalesce data in accordance with one embodiment of the present invention. The highest ranking entry and, thus, the entry that takes priority over all other entries is the user entry shown at block 817. Below that is the next highest ranking entry, the user group entry shown at block 819. Values in properties contained in the group entry are overridden by values of matching properties in the user entry. Block 821 is the client profile entry. Values of properties in the group entry override matching property values in the client profile entry. At the bottom of the hierarchy in the described embodiment is the client platform entry shown at block 823. Values of properties in this entry are overridden by values of any matching properties in any of the other three categories. In other preferred embodiments, the priority order can be arranged differently and may also include additional or fewer entries in the hierarchy.

Figure 9A:
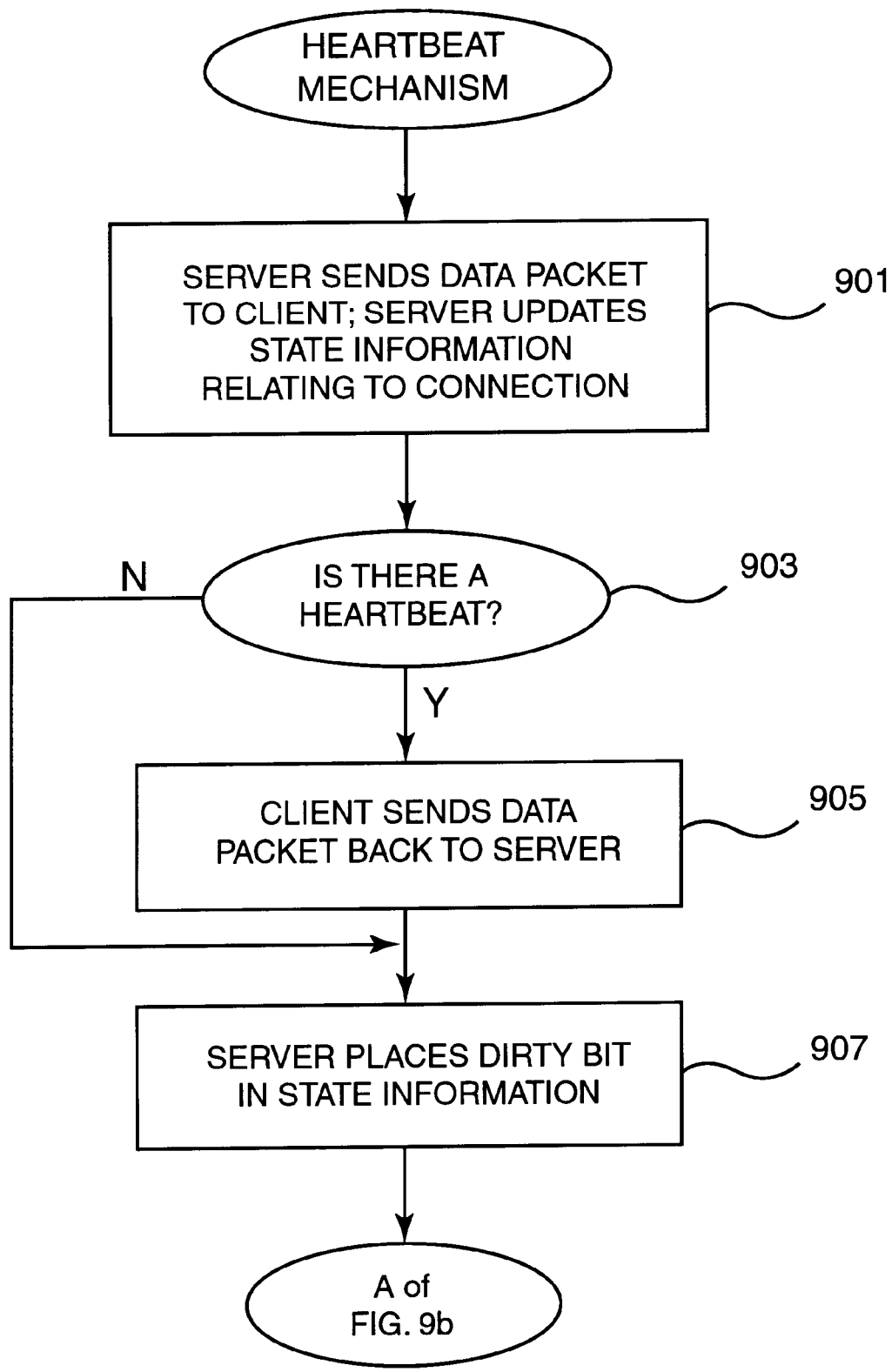
FIGS. 9a and 9b are flowcharts showing a process of periodically sending signals between a server to a client to indicate that the connection between them is still alive in accordance with one embodiment of the present invention.
Figure 9B:
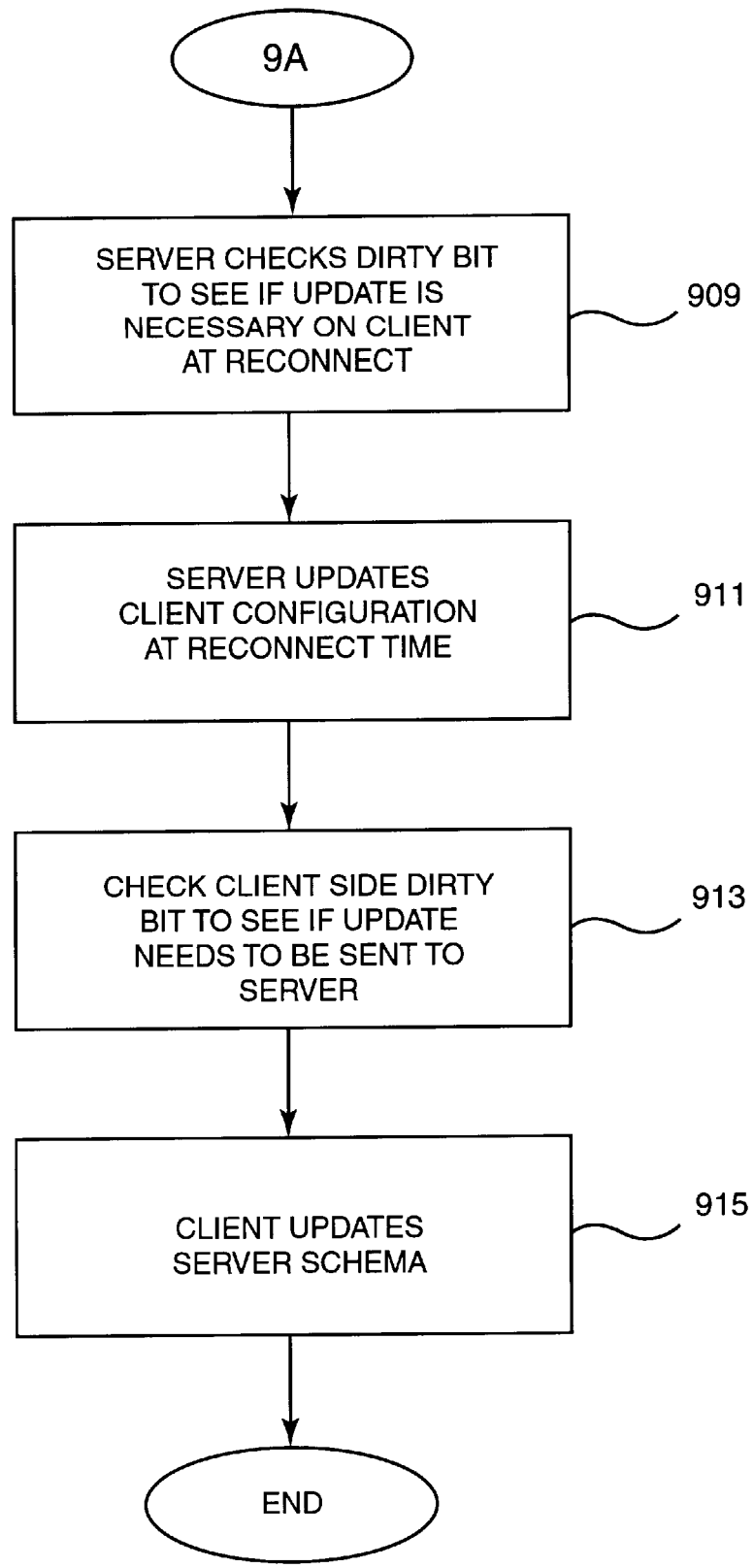

One feature of the client/server protocol is referred to as a heartbeat mechanism which allows the client or the server to be informed when the connection between the two is broken or disrupted. FIGS. 9a and 9b are flowcharts showing a process of periodically sending signals between a server to a client to indicate that the connection between them is still alive in accordance with one embodiment of the present invention. The heartbeat mechanism typically begins soon after the negotiation phase (step 609 and FIG. 7) and continues throughout the time the connection is up between the client and the server. It is an important feature that either the client or the server be informed when the connection between the two is disconnected or disrupted. At step 901 the server sends a data packet to the client. The first time this occurs is typically right after the negotiation phase and is sent at regular intervals while the connection is up. In the described embodiment, a heartbeat daemon runs on both the client and server and is essentially one thread in the client/server protocol. In other preferred embodiment, the deamon can run on either the server or the client and can be multi-threaded process. The server maintains state information on the connection and includes data such as the time that data packets were sent to the client. At step 903 the server determines whether there is a return data packet from the client, i.e., a heartbeat. If there is a heartbeat at step 905 the data packet from the client is sent to the server. At 901 the server again sends a data packet to the client after a set time interval such as 10 minutes. In other preferred embodiments, the time can be greater or less.

If it is determined at step 903 that the client has not sent back a data packet to the server, i.e., there is no heartbeat, the server uses the state information and structure (a directory cache) to indicate that there was no return data packet. This is done at step 907. A dirty bit is placed in the structure to indicate that the connection has been broken. At step 909 the server and client attempt to reconnect at which time the server checks the dirty bit in its state structure to see if an update is necessary on the client. This can arise if there are changes made to the configuration information on the server that relates to the client. At step 911 the server updates the client configuration. Similar to the directory cache state structure on the server, the client also has a similar structure indicating the state information which may contain a dirty bit to indicate if an update should be sent to the server from the client. Thus, at step 913 the client checks its dirty bit to see if an update should be sent to the server. At step 915 the client updates the server schema. At this point the reconnection between the client and server has been reestablished and the heartbeat mechanism resumes operation after the negotiation phase is complete.

Figure 10:
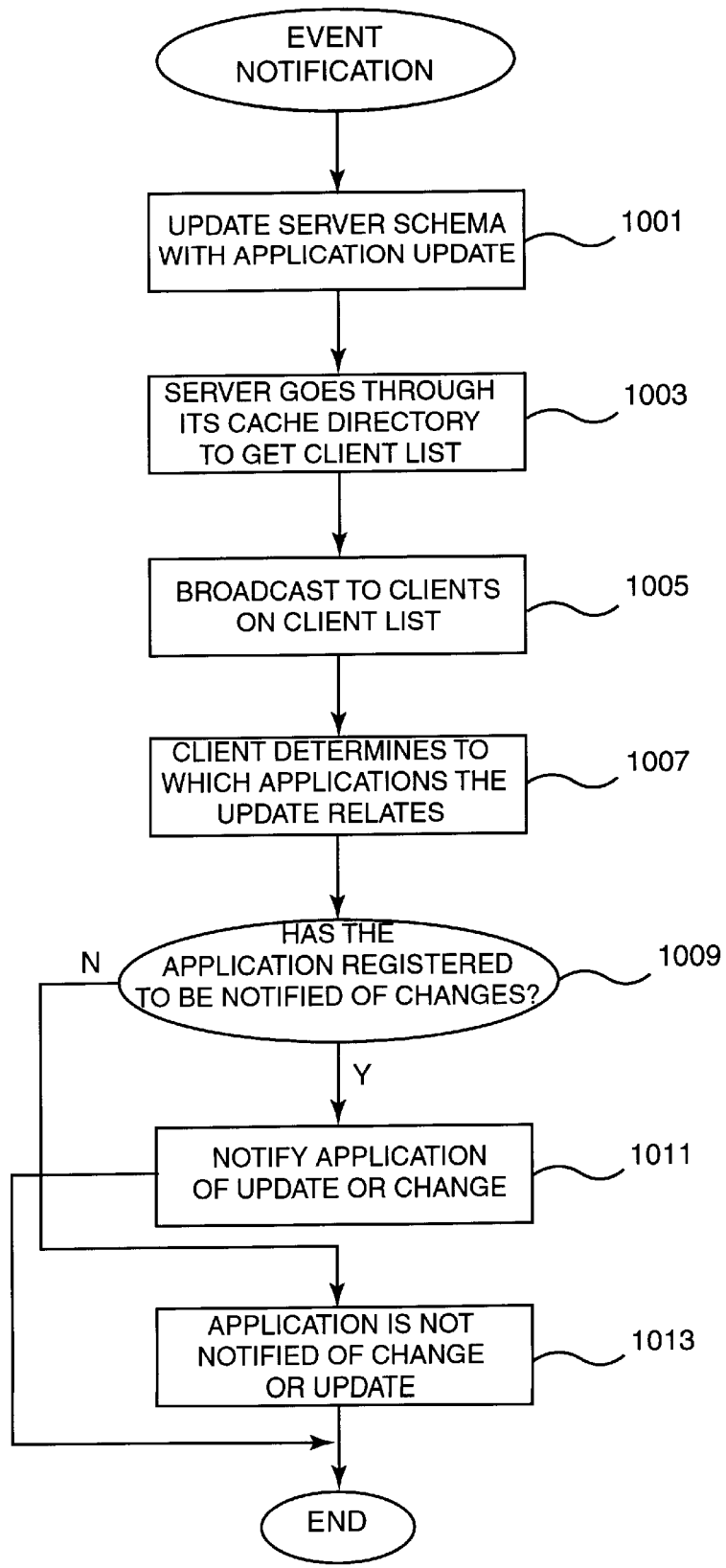
FIG. 10 is a flowchart of a process of event notification in the client/server protocol in accordance with one embodiment of the present invention.

Another feature of the client/server protocol of the present invention is the ability to notify clients using a particular application of updates to that application made on the server. FIG. 10 is a flowchart of a process of event notification in the client/server protocol in accordance with one embodiment of the present invention. At step 1301 the server schema is updated with a application fix or change or is modified with a general configuration update. At step 1003 the server examines its cache directory to see which clients are using the configuration data that was changed or which clients would want to be informed of the general configuration change made in the server schema. The server cache directory is a list of being used by clients that are connected to the server. At step 1005 the server broadcasts the update or change to the appropriate clients. On the client side the client determines which applications might be effected by the update or whether the general configuration update is relevant to that particular client at step 1007. At step 1009 the client determines whether the application that is being effected by the update is registered to be notified of any changes to the application. If the application is registered to be notified control goes to step 1011 where the application is notified of the update at step 1011. At this stage the process is complete. If the application has not registered to be notified of the change the application ignores the change or update and continues without being notified.

Another feature of the client/server protocol of the present invention is the ability to either guarantee that a particular operation was done or not done. This feature is referred to as atomicity of the client/server protocol. The client/server protocol implements a two-phase commit procedure for performing updates in the client and server schema. In the first phase the root of the sub-tree of the schema is locked in order for an update to be made to one of the entries in that particular sub-tree. In the second phase the update is performed in one of the entries in the sub-tree and the root of that sub-tree is then unlocked. By locking the root of the sub-tree all entries and nodes below the root in that sub-tree cannot be accessed by other clients or applications. Another client application that tries to update an entry in the sub-range that has been locked will have either a block or unblock transaction. If the client application desires to wait for the unlock to occur and then make its own update, that transaction is said to be a block transaction. In this scenario the update is placed in a queue. If the application does not want to wait for the lock to be removed, the transaction is referred to as a non-block transaction and is returned to the application. Through this mechanism the client/server protocol can guarantee to a client application that either the operation or update requested will be performed, i.e. that the transaction is blocked or that the operation was not performed, i.e. the transaction was non-blocked.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 11:
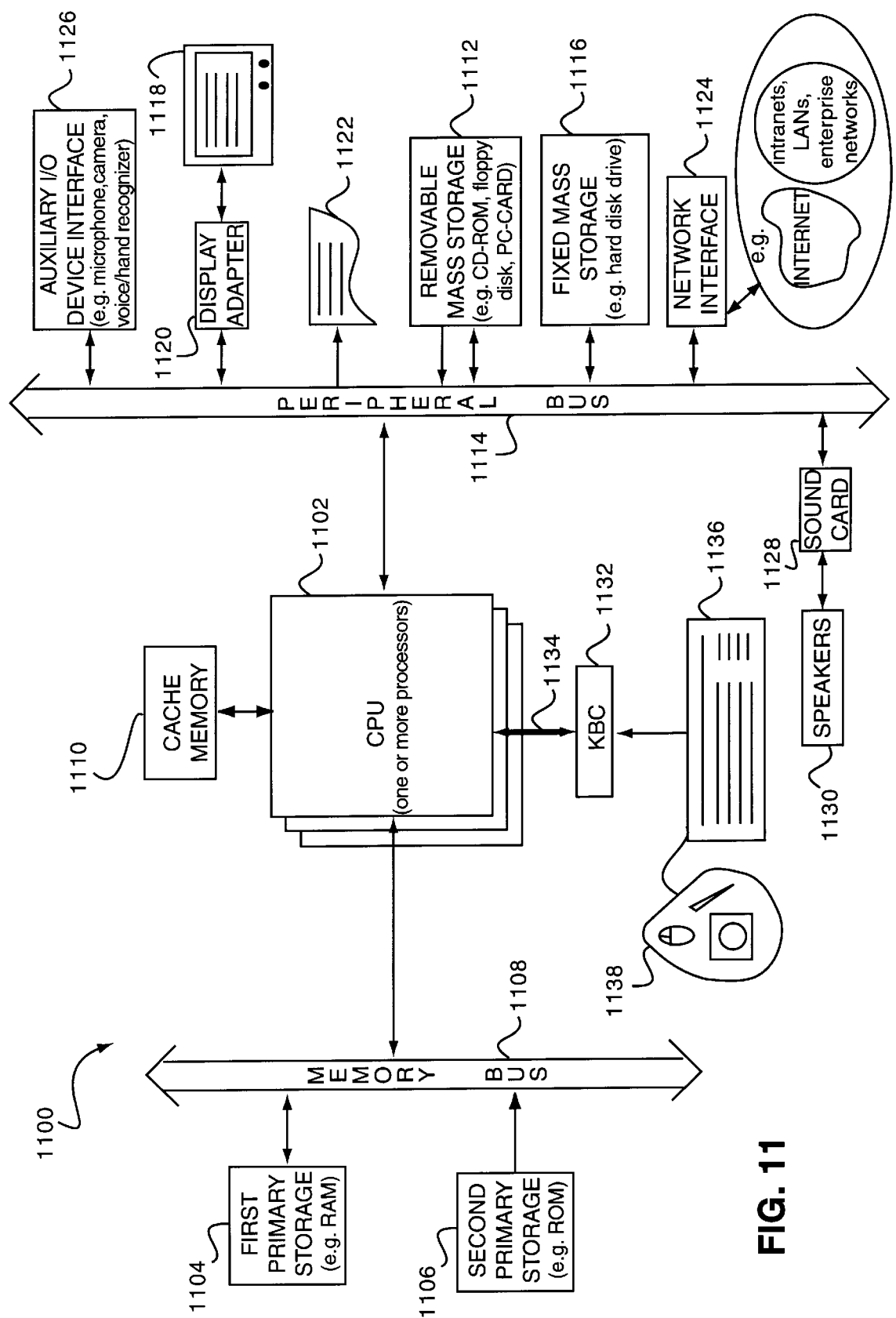
FIG. 11 is a block diagram of a typical computer system suitable for implementing the described embodiment of the present invention.

FIG. 11 is a block diagram of a general purpose computer system 1100 suitable for carrying out the processing in accordance with one embodiment of the present invention. FIG. 11 illustrates one embodiment of a general purpose computer system. Other computer system architectures and configurations can be used for carrying out the processing of the present invention. Computer system 1100, made up of various subsystems described below, includes at least one microprocessor subsystem (also referred to as a central processing unit, or CPU) 1102. That is, CPU 1102 can be implemented by a single-chip processor or by multiple processors. CPU 1102 is a general purpose digital processor which controls the operation of the computer system 1100. Using instructions retrieved from memory, the CPU 1102 controls the reception and manipulation of input data, and the output and display of data on output devices.

CPU 1102 is coupled bi-directionally with a first primary storage 1104, typically a random access memory (RAM), and uni-directionally with a second primary storage area 1106, typically a read-only memory (ROM), via a memory bus 1108. As is well known in the art, primary storage 1104 can be used as a general storage area and as scratch-pad memory, and can also be used to store input data and processed data. It can also store programming instructions and data, in the form of a message store in addition to other data and instructions for processes operating on CPU 1102, and is used typically used for fast transfer of data and instructions in a bi-directional manner over the memory bus 1108. Also as well known in the art, primary storage 1106 typically includes basic operating instructions, program code, data and objects used by the CPU 1102 to perform its functions. Primary storage devices 1104 and 1106 may include any suitable computer-readable storage media, described below, depending on whether, for example, data access needs to be bi-directional or uni-directional. CPU 1102 can also directly and very rapidly retrieve and store frequently needed data in a cache memory 1110.

A removable mass storage device 1112 provides additional data storage capacity for the computer system 1100, and is coupled either bi-directionally or uni-directionally to CPU 1102 via a peripheral bus 1114. For example, a specific removable mass storage device commonly known as a CD-ROM typically passes data uni-directionally to the CPU 1102, whereas a floppy disk can pass data bi-directionally to the CPU 1102. Storage 1112 may also include computer-readable media such as magnetic tape, flash memory, signals embodied on a carrier wave, PC-CARDS, portable mass storage devices, holographic storage devices, and other storage devices. A fixed mass storage 1116 also provides additional data storage capacity and is coupled bi-directionally to CPU 1102 via peripheral bus 1114. The most common example of mass storage 1116 is a hard disk drive. Generally, access to these media is slower than access to primary storages 1104 and 1106. Mass storage 1112 and 1116 generally store additional programming instructions, data, and the like that typically are not in active use by the CPU 1102. It will be appreciated that the information retained within mass storage 1112 and 1116 may be incorporated, if needed, in standard fashion as part of primary storage 1104 (e.g. RAM) as virtual memory.

In addition to providing CPU 1102 access to storage subsystems, the peripheral bus 1114 is used to provide access other subsystems and devices as well. In the described embodiment, these include a display monitor 1118 and adapter 1120, a printer device 1122, a network interface 1124, an auxiliary input/output device interface 1126, a sound card 1128 and speakers 1130, and other subsystems as needed.

The network interface 1124 allows CPU 1102 to be coupled to another computer, computer network, or telecommunications network using a network connection as shown. Through the network interface 1124, it is contemplated that the CPU 1102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1102 can be used to connect the computer system 1100 to an external network and transfer data according to standard protocols. That is, method embodiments of the present invention may execute solely upon CPU 1102, or may be performed across a network such as the Internet, intranet networks, or local area networks, in conjunction with a remote CPU that shares a portion of the processing. Additional mass storage devices (not shown) may also be connected to CPU 1102 through network interface 1124.

Auxiliary I/O device interface 1126 represents general and customized interfaces that allow the CPU 1102 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1102 is a keyboard controller 1132 via a local bus 1134 for receiving input from a keyboard 1136 or a pointer device 1138, and sending decoded symbols from the keyboard 1136 or pointer device 1138 to the CPU 1102. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1108, peripheral bus 1114, and local bus 1134 are illustrative of any interconnection scheme serving to link the subsystems. For example, a local bus could be used to connect the CPU to fixed mass storage 1116 and display adapter 1120. The computer system shown in FIG. 11 is but an example of a computer system suitable for use with the invention. Other computer architectures having different configurations of subsystems may also be utilized to implement the client computer or server computer of the present invention. In another preferred embodiment of the present invention, the client computer is a network computer, or NC, which, in terms of functionality and storage capability, is between a fully self-sufficient "fat" client computer which could function as a stand-alone computer, and a dumb client which is almost completely dependent on a server or mainframe computer. In yet other preferred embodiments, the client schema can reside on non-computer devices such as smart cards and other smart appliances that can run the Java platform, in addition to computers with limited memory storage such as personal digital assistants (PDAs) and handheld computers.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of preparing data before sending it over a computer network, the method comprising:

retrieving a first set of data containing a first plurality of data items on a server computer;

retrieving a second set of data containing a second plurality of data items on the server computer, where the first set of data and the second set of data relate to a client computer;

associating data items in the first set of data with data items in the second set of data items thereby creating a plurality of data item correspondences;

determining a version of software to be used to exchange data between the client computer and the server computer;

applying a set of rules to the plurality of data item correspondences; and deriving a third set of data containing a third plurality of data items.

2. A method as recited in claim 1 further comprising:

establishing a connection between the client computer and the server computer; and sending a client profile from the client computer to the server computer.

3. A method of configuring a client computer in a computer network including a server computer, the method comprising:

establishing a connection between the client computer having a profile and the server computer;

determining a version of software to be used to exchange data between the client computer and the server computer;

sending the profile to the server;

retrieving configuration information relating to the client computer, the configuration information stored under control of the server computer and derived according to the profile;

configuring the client computer using the configuration information, thereby facilitating centralized management of configuration information by the server computer.

4. A method as recited in claim 3 wherein sending the profile to the server further comprises arranging the profile information to include hardware information relating to the client computer and information relating to a user of the client computer.

5. A method as recited in claim 3 wherein the client computer is a network computer.

6. A method as recited in claim 3 wherein the server computer stores configuration information relating to a plurality of client computers.

* * * * *